Aug. 18, 1942.　　　C. OTTO　　　2,293,074
HORIZONTAL COKE OVEN BATTERY
Filed April 26, 1941　　2 Sheets-Sheet 1
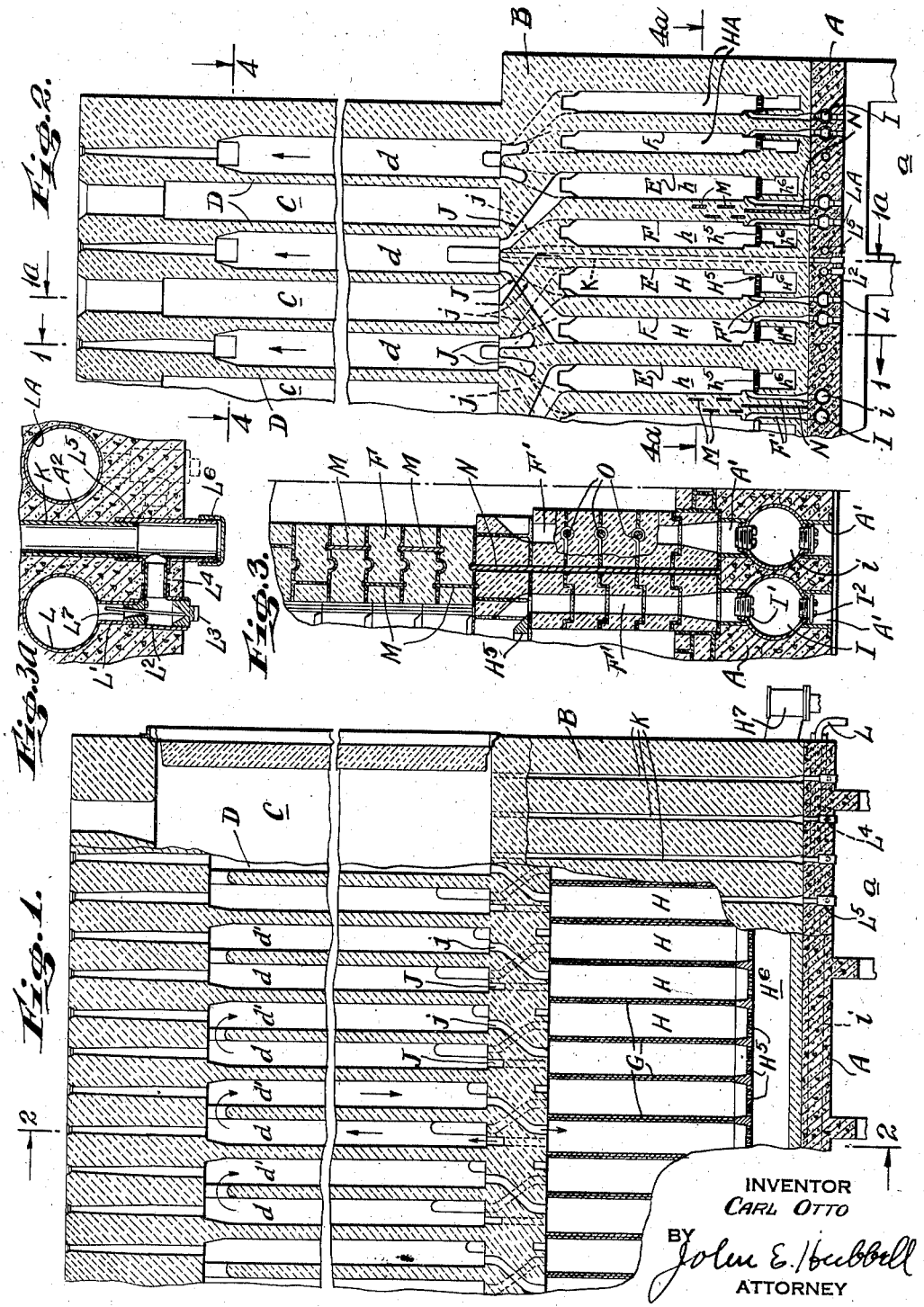
INVENTOR
CARL OTTO
BY
John E. Hubbell
ATTORNEY Aug. 18, 1942.  C. OTTO  2,293,074
HORIZONTAL COKE OVEN BATTERY
Filed April 26, 1941   2 Sheets-Sheet 2
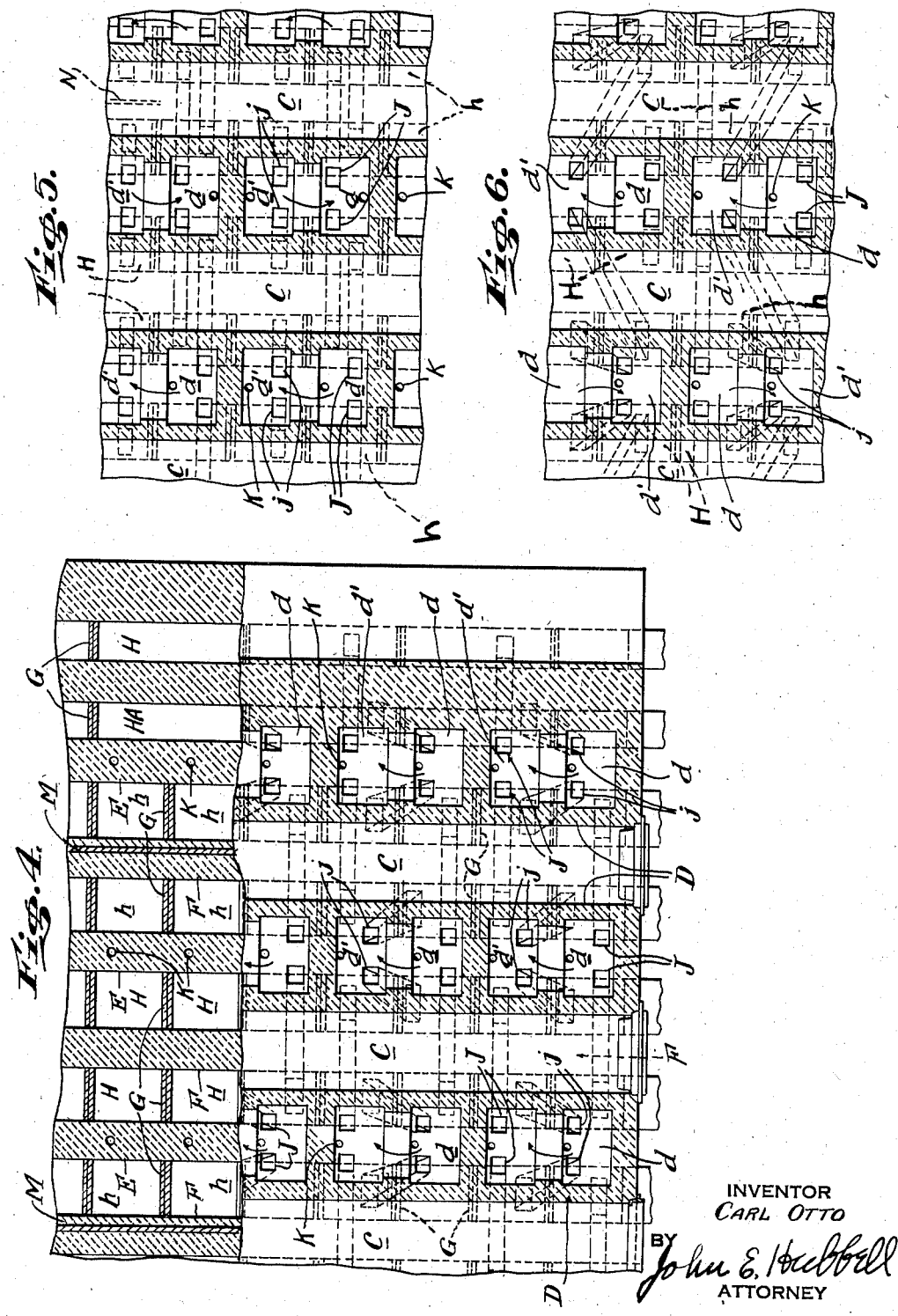
INVENTOR
CARL OTTO
BY John E. Hubbell
ATTORNEY Patented Aug. 18, 1942

2,293,074

UNITED STATES PATENT OFFICE 2,293,074

HORIZONTAL COKE OVEN BATTERY

Carl Otto, New York, N. Y., assignor to Fuel Refining Corporation, Dover, Del., a corporation of Delaware Application April 26, 1941, Serial No. 390,516

9 Claims. (Cl. 202—143)

The general object of the present invention is to improve the regenerative features of horizontal coke oven batteries and particularly batteries which are of the underfired type and are adapted to be heated either with the combustion of regeneratively preheated lean gas or rich gas not so preheated.

More specifically, the object of the invention is to provide improvements in the arrangement of regenerator cells and in the connection of such cells to the heating flues in a coke oven battery of the general type mentioned above in which each heating wall extending transversely of the battery is formed with a series of vertical flues connected in pairs, or groups at their upper ends to form two sets so that the flow therethrough at any one time is up or down in one set and down or up, respectively, in the other set, and in which each flue is separately connected at its lower end to one regenerator cell used in preheating combustion air and to a second regenerator cell, conveniently called a gas regenerator cell, which is optionally useable in preheating lean gas or combustion air, accordingly as the battery is heated by the combustion of lean fuel gas or rich fuel gas.

In the preferred form of the invention the heating flues in each heating wall are connected at their upper ends in pairs so that the two flues of each pair form the limbs of a so-called twin, or hairpin flue, and one limb of each of the hairpin flues in a heating wall is separately connected to a gas regenerator and to an air regenerator cell, respectively located in adjacent rows of said cells extending transversely of the battery, and the second limb of each hairpin flue in the same heating wall is separately connected to gas and air regenerator cells respectively included in rows of such cells at opposite sides of said adjacent rows of cells. Single rows of air regenerator cells may alternate with single rows of gas regenerator cells, but preferably pairs of rows of gas regenerator cells and rows of pairs of air regenerator cells alternate along the length of the battery.

The invention is characterized by the important practical advantages which include a desirable simplicity of the regenerator and heating wall connecting channels, and a desirable similarity in the form, dimensions and disposition between the two channels connecting each flue to the corresponding air and gas regenerator channels, such similarity contributing to easy and accurate regulation of combustion. The invention is further characterized by the fact that each regenerator division wall which includes uprising rich gas supply channels is located between a row of gas regenerator cells and a row of air regenerator cells which all serve at any one time either as "on" regenerators, or as "off" regenerators. There is thus no significant pressure differential tending to create leakage through the walls which include the rich gas supply channels and which for that reason are especially apt to develop cracks and open joints through which leakage may occur. The exclusion from each wall separating "on" or "off" regenerators from simultaneously "off" or "on" regenerators, minimizes the development of leakage paths through that wall and facilitates the inclusion in such walls of special leakage preventing means.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a partial transverse section of a coke oven battery with its left hand portion taken on the broken line 1—1 and with its right hand portion taken on the line 1a—1a of Fig. 2;

Fig. 2 is a partial longitudinal section taken on the line 2—2 of Fig. 1;

Figs. 3 and 3A are each partial sections taken similarly to Fig. 2 but on a larger scale;

Fig. 4 is a partial sectional plan with its lower portion taken on the line 4—4 and its upper portion on the line 4a—4a of Fig. 2;

Fig. 5 is a diagrammatic plan section taken similarly to the lower portion of Fig. 4 and illustrating a modification; and Fig. 6 is a diagrammatic plan section taken similarly to the lower portion of Fig. 4 and illustrating a second modification.

In Figs. 1–4 of the drawings I have illustrated the use of the present invention in a horizontal underfired regenerative coke oven battery adapted to be heated by either the combustion of lean gas such as blast furnace or producer gas, or of rich gas such as coke oven gas. The battery shown comprises a concrete layer A which constitutes a supporting deck for the coke oven brickwork B and forms the roof of the conventional basement space $a$ of the battery. The deck A may be supported by any usual or suitable means, which form no part of the present invention and are not illustrated or described herein. The coke oven brickwork comprises an upper story or section and a lower story or section. The upper story or section is shown as of well known type comprising horizontally elongated coking chambers C alternating with heating walls D, each of the chambers and walls extending from one side of the battery to the other. Each heating wall is formed with vertical flues $d$ and $d'$ alternating with one another in a row extending from one side of the battery to the other. Each flue $d$ and an adjacent flue $d'$ are connected at their upper ends and thus form the two limbs of a twin or hairpin flue.

In the lower story or section of the battery, regenerator division walls E and F extending between the opposite sides of the battery alternate along the length of the latter. As shown, there is a wall E beneath each heating wall D and a wall F beneath each coking chamber C. The walls E and F are conveniently designated "pillar" and "intermediate" walls, respectively, although they may be similar in thickness and each contributes to the support for the battery upper story or section. Between each pillar wall E and each adjacent intermediate wall F is a regenerative space extending transversely of the battery and divided by partitions G extending longitudinally of the battery into a row of vertically disposed air preheating regenerator cells H or into a similar row of regenerator cells $h$ conveniently referred to as gas regenerator cells, although they are adapted for use either in preheating combustion air or lean fuel gas accordingly as the battery is heated by the combustion of rich fuel gas not regeneratively preheated, or by the combustion of lean fuel gas preheated in the regenerator cells $h$. The regenerator cell partition walls G may be formed in any suitable manner, but conveniently and preferably are formed by portions of the regenerator checkerbricks each of which comprises a body portion formed with vertical passages and located within the regenerator cell of which it forms opposing wall portions, as is shown in Fig. 1, and is more fully disclosed in my prior Patent 2,216,983, granted October 8, 1940. To simplify the illustration, only the cell wall forming portions G of the checkerbricks are shown in Fig. 4.

In accordance with the present invention there is a row of air regenerator cells H at one side and a row of gas regenerator cells $h$ at the opposite side of each pillar wall E. In the preferred form of the invention illustrated in Figs. 1-4, two rows of air regenerator cells H alternate with two rows of gas regenerator cells $h$ along the length of the battery, though major objects of the invention may be attained with single rows of air regenerator cells alternating with single rows of gas regenerator cells $h$ along the length of the battery, as shown in Fig. 6.

In each form of the invention illustrated, each row of regenerator cells H or $h$ receives the combustible agent, air or lean fuel gas, which it preheats, through a corresponding horizontal distribution pipe I or $i$, respectively. Each of said pipes is shown as embedded in the concrete layer A and formed with a multiplicity of upper outlets distributed along its length, one for each of the regenerator cells served by the pipe. The flow through each of said outlets is regulated by the size of the measuring orifice or nozzle passage in a nozzle member I' threaded into or otherwise removably mounted in the outlet opening. To provide access for cleaning or replacing each member I', the pipe is formed with a registering opening in the bottom wall normally closed by a plug $I^2$ accessible for removal from the basement space through the lower portion of a vertical passage A' in the deck A. As shown, the pipes I and $i$ for the rows of regenerator cells at opposite sides of and immediately adjacent each intermediate wall F are located beneath the latter. Each nozzle I' discharges into the upper portion of the corresponding passage A' which communicates at its upper end with the lower end of a corresponding brickwork channel F' formed in the superposed wall F. Each channel F' is enlarged and opens laterally at its upper end into the corresponding regenerator cell H or $h$ above the grid-like refractory parts $H^5$ or $h^5$ between the regenerator cell checkerbricks and the subjacent horizontal regenerator sole channel $H^6$ or $h^6$. Each of said regenerator sole channels $H^6$ and $h^6$ may extend from one side to the other of the battery, and may be connected at one end or at each end through a corresponding reversing valve $H^7$ to a corresponding waste heat tunnel of usual form (not shown).

In accordance with the present invention there are as many regenerator cells H and $h$ in each row of cells with the exception of the two rows at each end of the battery, as there are heating flues $d$ and $d'$ in each heating wall. Each of the two rows of air regenerator cells at one end of the battery and gas regenerator cells at the opposite end of the battery includes half as many cells as the other cell rows and the end row cells may well be twice as long and somewhat more than half as wide as the other cells. Air regenerator cells HA at one end of the battery are shown in Fig. 4. The battery thus includes twice as many regenerator cells as heating flues $d$ and $d'$. At its upper end each of the regenerator cells is connected by a brickwork channel J or $j$ to a single flue $d$ or $d'$ located in a heating wall above one or the other of the two pillar walls E at opposite sides of said regenerator cell. Each of the heating flues $d$ and $d'$ is connected by one channel J or $j$ to an air preheating regenerator cell and is connected by a second channel J or $j$ to a gas preheating regenerator cell.

As shown, each flue $d$ in the central heating wall of Fig. 2 is connected by one channel J to an air preheating cell H at the left hand side of the intermediate wall F which is at the left hand side of the pillar wall E directly beneath the flue, and is connected by a second channel J to a gas preheating regenerator cell $h$ at the right hand side of the intermediate wall F at the right hand side of the pillar wall beneath the flue, and each flue $d'$ in the same central heating wall of Fig. 2 is connected by its two channels $j$ to air and gas preheating cells H and $h$ at opposite sides of and immediately adjacent the pillar wall directly beneath the flue. The regenerator cell connections to the flues of the central heating wall of Fig. 2 are duplicated for every second heating wall along the length of the battery, in the form of the invention shown in Figs. 1-4. In each of the other heating walls of the battery shown in Figs. 1-4, each flue $d$ is connected (see Figs. 2 and 4) by separate channels $j$ to an air regenerator cell H and a gas regenerator cell $h$ immediately adjacent the subjacent pillar wall E and each flue $d'$ is connected by channels J to air and gas regenerator cells H and $h$ in the rows of such cells at the opposite sides of the rows of cells immediately adjacent the pillar wall beneath the flue.

In the construction shown in Figs. 1–4, at each side of the battery the twin flue at the end of every second heating wall has each of its limbs connected by the corresponding channels J and $j$ to air and gas regenerator cells in a row of such cells extending longitudinally of the battery and directly adjacent the corresponding side of the battery, and at the same side of the battery the end twin flues of the other heating walls are connected by corresponding channels J and $j$ to regenerator cells in a second row of such cells extending longitudinally of the battery directly alongside the previously mentioned cell row. The arrangement, shown in Fig. 4, of the twin flues at the ends of the heating walls and the regenerator cells connected thereto, in rows extending longitudinally of the battery, is repeated for each of the other twin flues of the heating walls, in the alternative constructions shown in Figs. 5 and 6, as well as in the construction shown in Figs. 1–4.

The battery construction illustrated diagrammatically in Fig. 5 differs from that shown in Figs. 1–4, in that in Fig. 5 the channels $j$ as well as the channels J, extend in the direction of planes parallel the sides of the battery. In Fig. 5, also, the direction of gas flow in the flues in each row of flues $d$ or $d'$ extending longitudinally of the battery, is up or down in every second flue in the row and simultaneously down or up, respectively, in the other flues in the row.

In the respect last noted, the construction shown in Fig. 6 is like that shown in Fig. 5. Fig. 6 also illustrates two other unrelated variations in form from the construction shown in Figs. 1–4. Thus, in every second heating wall along the length of the battery illustrated in Fig. 6, each longer channel J has its upper and lower ends at different distances from each side of the battery while each shorter channel $j$ has its upper and lower ends at the same distance from each side of the battery. In the other heating walls of Fig. 6 the channels J and $j$ are disposed as in Figs. 1–4. The further variation from the construction shown in Figs. 1–4 illustrated in Fig. 6, is the alternation of a single row of air regenerator cells with a single row of gas regenerator cells along the length of the battery. This variation is ordinarily open to the objection, to which further reference is hereinafter made of doubling the number of intermediate walls F separating regenerator cells through which lean gas being preheated flows upward, from regenerator cells through which waste heating gases flow downward.

Each of the flues $d$ and $d'$ in each heating wall is adapted to receive rich fuel gas through a corresponding vertically extending channel K formed in the subjacent pillar wall E and opening at its upper end to the corresponding flue through a burner outlet at the desired level. The channels K which open at their upper ends to the flues $d$ in each heating wall are supplied with rich fuel gas through a corresponding horizontal distribution pipe L embedded in the masonry A and provided with a tubular depending outlet branch L' for each of the flues $d$ which it serves. Each depending outlet pipe L' is connected at its lower end into a T connector part $L^2$. The lower end of the latter extends below the bottom surface of the deck A and is internally threaded to receive a removable plug $L^3$. The transverse opening in the T part $L^2$ receives the corresponding end of a short horizontal pipe section $L^4$ having its other end connected to a vertical metal pipe $L^5$ lining the lower portion of a vertical channel $A^2$ formed in the deck A and in register with the corresponding channel K. The lower end of the pipe $L^5$ is closed by a cap $L^6$ which may be removed to permit of inspection and cleaning of the associated channel K. An orifice nozzle member $L^7$ removably threaded in the upper opening of each part $L^2$ regulates the volume of gas flow from the distribution pipe L to the corresponding flue $d$. The channels K in each heating wall which open at their upper ends into the flues $d'$ are supplied with rich fuel gas at appropriate times by means of a horizontal distribution pipe LA which may be identical in form and manner of its connections to the corresponding channels K to the pipe L. Each two associated pipes L and LA are located at opposite sides of the corresponding channels $A^2$ and K.

The desirable means just described for supplying regulated amounts of rich fuel gas to the heating flues, are not novel per se, but the present invention is advantageously characterized by its capacity for use of such rich gas supply provisions in combination with the novel arrangement of regenerator cells and their flue connections disclosed herein.

The general operation of the battery shown in Figs. 1–4 wil be readily apparent to those skilled in the art.

In consequence of the adjustment in the customary manner of reversing valves, which may be of the usual type and hence are not shown, during each of intermittent periods, combustion will be initiated in the combustion flues $d$ of the battery shown in Figs. 1–4, while during other intermittent periods alternating with the first mentioned periods, combustion is initiated in the flues $d'$. Ordinarily, each of said periods is of approximately one half hour duration. During each period in which combustion is initiated in the flues $d$, the regenerator cells H and $h$ directly connected by channels J and $j$ to the flues $d$, will serve as "on" regenerators to preheat combustion air, and the cells $h$ directly connected by channels $j$ to flues $d$ will serve as "on" regenerators preheating either combustion air or lean fuel gas, accordingly as the battery is being heated by the combustion of rich fuel gas or of lean fuel gas.

During the periods in which the regenerator cells directly connected to the flues $d$ serve as "on" regenerators, the remaining regenerator cells serve as "off" regenerators. In each other period in which combustion is initiated in the flues $d'$. the direction of gas flow through each regenerator cell heating flue and connecting channel is reversed, and the regenerators which were "off" regenerators during the preceding period, serve as "on" regenerators while the previously "on" regenerators become "off" regenerators. During any one period between reversals combustible air or air and lean gas are distributed only by such of the pipes I and $i$ as are connected to the regenerator cells then serving as "on" regenerators, and the rich fuel gas, if any, then being used, will be supplied by the appropriate one of each pair of supply pipes L and LA.

In the modification shown in Fig. 5, as will be apparent from that figure, during one period between reversals, combustion is initiated in the flues $d$ of one half only of the heating walls and combustion is then being initiated also, in the flues $d'$ of the other heating walls. During the period following the next reversal, combustion will be initiated in the flues $d$ of the last mentioned heating walls and in the flues $d'$ of the first mentioned heating walls. In the respect just noted, the construction shown in Fig. 6 is like that of Fig. 5 and unlike that of Figs. 1–4. As those skilled in the art will understand, this difference in operation between the constructions shown in Figs. 5 and 6, and that shown in Figs. 1–4 is formal and of no practical importance. There is no significant practical importance in the difference in the operation of the two forms, arising from the fact that in Figs. 1–4 the flow is always in the same direction, up or down, in any row of flues $d$ or $d'$ extending longitudinally of the battery, whereas with the constructions shown in Figs. 5 and 6, the flow is up in every second flue in any such longitudinal row and is down in the other flues in that row.

As previously indicated, the inclusion of the rich gas supply channels K in a regenerator division wall increases the tendency to the development of cracks and open joints providing leakage paths through the wall. With the arrangement shown in Figs. 1–4, however, there will be no significant pressure differential tending to produce leakage through the pillar walls E including the channels K, since the regenerator cells H and $h$ at opposite sides of each pillar wall E are always both "on," or both "off" regenerators at the same time. There will be a pressure differential, however, between regenerator cells at opposite sides of each intermediate wall F. Any leakage which may occur through the walls F separating rows of air regenerator cells H can ordinarily result in nothing but a small and relatively unimportant reduction in regenerator efficiency, but leakage through the walls F which separate rows of regenerator cells $h$ is definitely objectionable. Such leakage is of combustible gas from the "on" regenerator cells $h$, then in use in preheating combustion gas, into the "off" regenerator cells $h$ in which the leakage gas will unite in combustion with "excess" air in the descending waste gases. This involves a waste of fuel gas, and may be destructive to the regenerator structure.

In practice, it is possible to substantially eliminate risk of leakage through the walls F separating rows of regenerator cells $h$ by employing special wall construction features. Thus, in my above mentioned prior Patent 2,216,983, I have disclosed the use of vertically disposed leakage barrier plates of heat resistant metal in the lower portion of regenerator division walls where the temperatures are lower and leakage inducing pressure differentials are higher than in the upper portions of the wall. In the constructions illustrated herein I make use of such metallic leakage barrier plates, but in a form differing specifically from those illustrated especially in said prior patent.

As shown best in Figs. 3 and 4 hereof, use is made of leakage barrier plates M, each of which may extend from one end of the wall to the other. Ordinarily, and as shown, each plate M is substantially shorter than the wall in which it is included and forms one of a series of plates extending from one end of the wall to the other, with end portions of adjacent plates in the series overlapping one another. Preferably and as shown, the bricks or refractory shapes in adjacent courses of the wall are so proportioned and disposed that the plates M in one of each two superposed masonry courses will be at one side and the plates M in the other of said courses will be at the other side of the central plane of the wall.

In the construction shown in Figs. 3 and 4, each wall F including leakage barrier plates M has such plates located above the level of the bottoms of the stacks of regenerator checkerbricks, and in its portion below that level includes a single central leakage barrier N. The latter may be formed by a single strip of sheet metal or, preferably, by a series of shorter overlapping sections of sheet metal. If desired, the brickwork at opposite sides of the barrier N may be tied together by metallic connectors O connected to the barrier N. These leakage barrier features need not be further illustrated or described herein, however, for the reason that while the construction shown in Figs. 3 and 4 is well adapted for use in the coke oven structures illustrated herein, it is not essential to the use of the invention claimed herein, and for the further reason that while it includes novel features invented by me, those features are not claimed herein, but in my copending application, Serial No. 369,205, filed December 9, 1940.

As previously pointed out, in the construction shown in Figs. 1–4 the pressures normally prevailing at the opposite sides of each of the intermediate walls F are different and to substantially eliminate risk of leakage through it, each of those walls may be provided with special leakage preventive means such as those illustrated in Fig. 3. As already indicated, however, such leakage as may normally be expected through the walls F separating air regenerator cells H will ordinarily not be sufficiently objectionable to require the inclusion in the walls of leakage prevention means. With pairs of air regenerators alternating with pairs of gas regenerators, as shown in Fig. 4, it may well be practically sufficient and desirable to include special leakage prevention means only in every fourth heating wall along the length of the battery. With single rows of air and gas regenerators alternating along the length of the battery, as shown in Fig. 6, every second wall F will present the same need for special leakage provisions as exists in the case of every fourth wall F of Figs. 1–4.

As those skilled in the art will readily understand, the present invention provides a regenerator arrangement well adapted for use with heating walls having hairpin flues in which the risk of leakage through regenerator division walls, and the objectionable consequence of such leakage, are suitably minimized, and which permits the regenerator cells to be connected to the heating flues by channels desirably simple in form and which may be included in brickwork consisting of relatively simple parts or "shapes."

With each flue connected to air and gas regenerator cells on opposite sides of the pillar wall beneath the flue, the spacing of the channels through which each vertical flue is connected to the cells is such as to provide ample space for two rich gas supply channels opening to a single flue at different burner outlet levels, as disclosed in my prior Patent 1,748,143, granted February 25, 1930, when conditions make such an arrangement desirable.

My invention considered generally is characterized by the fact that it permits of the use of approved and relatively simple forms of construction, and permits of the full attainment of the advantageous control of combustion conditions in each of the multiplicity of heating flues of a battery which is inherent in a battery in which each of the combustible agents i. e., regeneratively preheated combustion air, regeneratively preheated lean fuel gas, and unregeneratively preheated rich fuel gas, may be supplied to each combustion flue at a definite and regulable rate, and in which the maximum heating system pressure differentials tending to produce leakage through portions of the battery brickwork can be maintained relatively and desirably low.

While in accordance with the provisions of the statutes, I have illustrated and described the best forms of embodiment of my invention now known to me, it will be apparent to those skilled in the art that changes may be made in the form of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. A horizontal coke oven battery comprising transverse coking chambers, heating walls alongside the coking chambers and each formed with a plurality of vertical flues connected at their upper ends to form two sets in one of which the flow is up or down while the flow in the other set is respectively down or up, rows of air preheating regenerator cells and rows of gas preheating regenerator cells beneath and parallel to said chambers and heating walls, the number of regenerator cells in each row corresponding to the number of flues in each heating wall, channels connecting the regenerator cells each to a single flue, each flue of the said one set in each heating wall being connected to one cell in a row of air preheating cells and to one cell in a row of gas preheating cells adjacent the first mentioned row, the two last mentioned rows of cells lying between a row of air preheating cells and a row of gas preheating cells, and each flue in the said other set in the last mentioned heating wall being connected to one cell in each of the last mentioned rows of cells.

2. A coke oven battery as specified in claim 1, in which two rows of air regenerating cells alternate with two rows of gas preheating cells along the length of the battery.

3. A coke oven battery as specified in claim 1, in which two rows of air regenerating cells alternate with two rows of gas preheating cells along the length of the battery and in which the regenerator cells in one of the two side by side rows of gas preheating cells are "on" or "off" when the cells in the second of said two rows are respectively "off" or "on" and in which a wall including leakage preventive means separates the cells in one from the cells in the other of said two rows of gas preheating cells.

4. A coke oven battery as specified in claim 1, adapted for optional use of all of its regenerator cells in preheating air, and including a pillar wall beneath each heating wall and separating the two rows of cells adjacent one another and including the cells to which the said one set of flues in the last mentioned heating wall are connected and in which uprising rich gas supply channels formed are in each such pillar walls and communicate at their upper ends with the different flues in the superposed heating wall.

5. A coke oven battery as specified in claim 1, in which the heating flues in each heating wall are connected at their tops in pairs so that the two flues of each pair form the two limbs of a hairpin flue, and in which the four regenerator cells connected to the two limbs of each hairpin flue are arranged in a row extending longitudinally of the battery.

6. A coke oven battery as specified in claim 1, in which the hairpin flues in a row extending longitudinally of the battery and including a single hairpin flue in each heating wall are connected to air and gas regenerator cells all arranged in two side by side cell rows extending longitudinally of the battery with the four cells connected to the two limbs of each of said hairpin flues all included in one of said cell rows and with the four regenerator cells connected to the limbs of each immediately adjacent hairpin flue included in the other of said cell rows.

7. A coke oven battery as specified in claim 1, in which the heating flues in each heating wall are connected at their tops in pairs so that the two flues of each pair form the two limbs of a hairpin flue, and in which the four regenerator cells connected to the two limbs of each hairpin flue are arranged in a row extending longitudinally of the battery and displaced transversely of the battery from one of said limbs and in which the channels connecting said one limb to the corresponding regenerator cells are inclined to a vertical plane parallel to the length of the battery.

8. A coke oven battery as specified in claim 1, in which the heating flues in each heating wall are connected at their tops in pairs so that the two flues of each pair form the two limbs of a hairpin flue, and in which the four regenerator cells connected to the two limbs of each hairpin flue are arranged in a row extending longitudinally of the battery, and displaced transversely of the battery from the one of said limbs connected to the air and gas regenerator cells in adjacent transverse cell rows, and in which the channels connecting the last mentioned cells to said limb are inclined to a vertical plane parallel to the length of the battery.

9. A horizontal coke oven battery comprising transverse coking chambers, heating walls alongside and alternating with said coking chambers and each formed with a plurality of vertical heating flues distributed along its length and connected together in pairs at their upper ends so that each flue forms one limb of a twin flue, pillar walls beneath and parallel to each heating wall, an intermediate regenerator division wall parallel to and spaced between each two adjacent pillar walls and separated from each by a space, means dividing each such space into a row of regenerator cells equal in number to the flues in each heating wall, channels separately connecting each of said cells to a single flue, said channels being arranged to connect one limb of each twin flue in each heating wall to two regenerator cells, one in each of the two rows of cells at opposite sides of and immediately adjacent the subjacent pillar wall and to connect the other limb of each twin flue to two regenerator cells one in each of the two rows of cells at opposite sides of and immediately adjacent the two rows of cells first mentioned.

CARL OTTO.